United States Patent [19]
Heidorn

[11] Patent Number: 6,006,628
[45] Date of Patent: Dec. 28, 1999

[54] APPARATUS FOR ATTACHING A VEHICLE STEERING WHEEL

[75] Inventor: Michael E. Heidorn, Beverly Hills, Mich.

[73] Assignee: TRW Inc., Lyndhurst, Ohio

[21] Appl. No.: 08/951,528

[22] Filed: Oct. 16, 1997

[51] Int. Cl.⁶ ............................... B62D 1/04; B25G 3/00
[52] U.S. Cl. ..................... 74/552; 403/379.4; 411/520
[58] Field of Search .................. 74/552; 403/359.5, 403/379.6, 324, 359.1, 379.4, 318, 355; 411/516, 520, 521

[56] References Cited

U.S. PATENT DOCUMENTS 3,391,953  7/1968  Jordan ..................................... 403/355
5,741,025  4/1998  Meyer et al. ......................... 74/552 X Primary Examiner—Thomas R. Hannon
Assistant Examiner—Colby Hansen
Attorney, Agent, or Firm—Tarolli, Sundheim, Covell, Tummino & Szabo LLP

[57] ABSTRACT

An apparatus includes a vehicle steering wheel (10) for attachment to a vehicle steering column (12). The steering wheel (10) is rotatable and has a hub (130) for non-rotatable attachment to an end (162) of the steering column (12) so that the steering column rotates about an axis (B) upon rotation of the steering wheel. The hub (130) has a first surface (138) defining a first passage (140) for receiving the end (162) of the steering column (12) and a second surface (152) defining a second passage (150) extending transverse to the first passage and partially intersecting the first passage. A hollow cylindrical member (200) blocks axial movement of the hub (130) relative to the steering column (12). The hollow cylindrical member (200) is radially contractible for insertion into the second passage (150) and is radially expandable into contact with the second surface (152) and the steering column (12).

7 Claims, 3 Drawing Sheets

6,006,628

APPARATUS FOR ATTACHING A VEHICLE STEERING WHEEL

FIELD OF THE INVENTION

The present invention relates to an apparatus for attaching a vehicle steering wheel to a vehicle steering column.

BACKGROUND OF THE INVENTION

A vehicle steering wheel is typically attached to a vehicle steering column by a splined connection. The splined connection non-rotatably attaches the steering wheel to the steering column and transmits torque from the steering wheel to the steering column. The steering wheel is also typically attached to the steering column to prevent relative axial movement between the steering wheel and the steering column. Usually, a nut is screwed onto a threaded extension located on the end of the steering column. The nut is normally accessed through the center of the steering wheel.

Certain steering wheel configurations, however, particularly those with an integrated (or non-removable) air bag cover, prevent access to the top of the steering column through the center of the steering wheel.

SUMMARY OF THE INVENTION

The present invention comprises a vehicle steering wheel for attachment to a vehicle steering column. The steering wheel is rotatable. The steering wheel has a hub for non-rotatable attachment to an end of the steering column so that the steering column rotates about an axis upon rotation of the steering wheel. The hub has first surface means for defining a first passage for receiving the end of the steering column and second surface means for defining a second passage extending transverse to the first passage and partially intersecting the first passage. Means is provided for blocking axial movement of the hub relative to the steering column. The means comprises a hollow cylindrical member which is radially contractible for insertion into the second passage and is radially expandable into contact with the second surface means and the steering column and blocks axial movement of the hub relative to the steering column.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIGS. 4–6 are three different perspective views showing a part of the invention in three different conditions.

DESCRIPTION OF PREFERRED EMBODIMENTS

Figure 1:
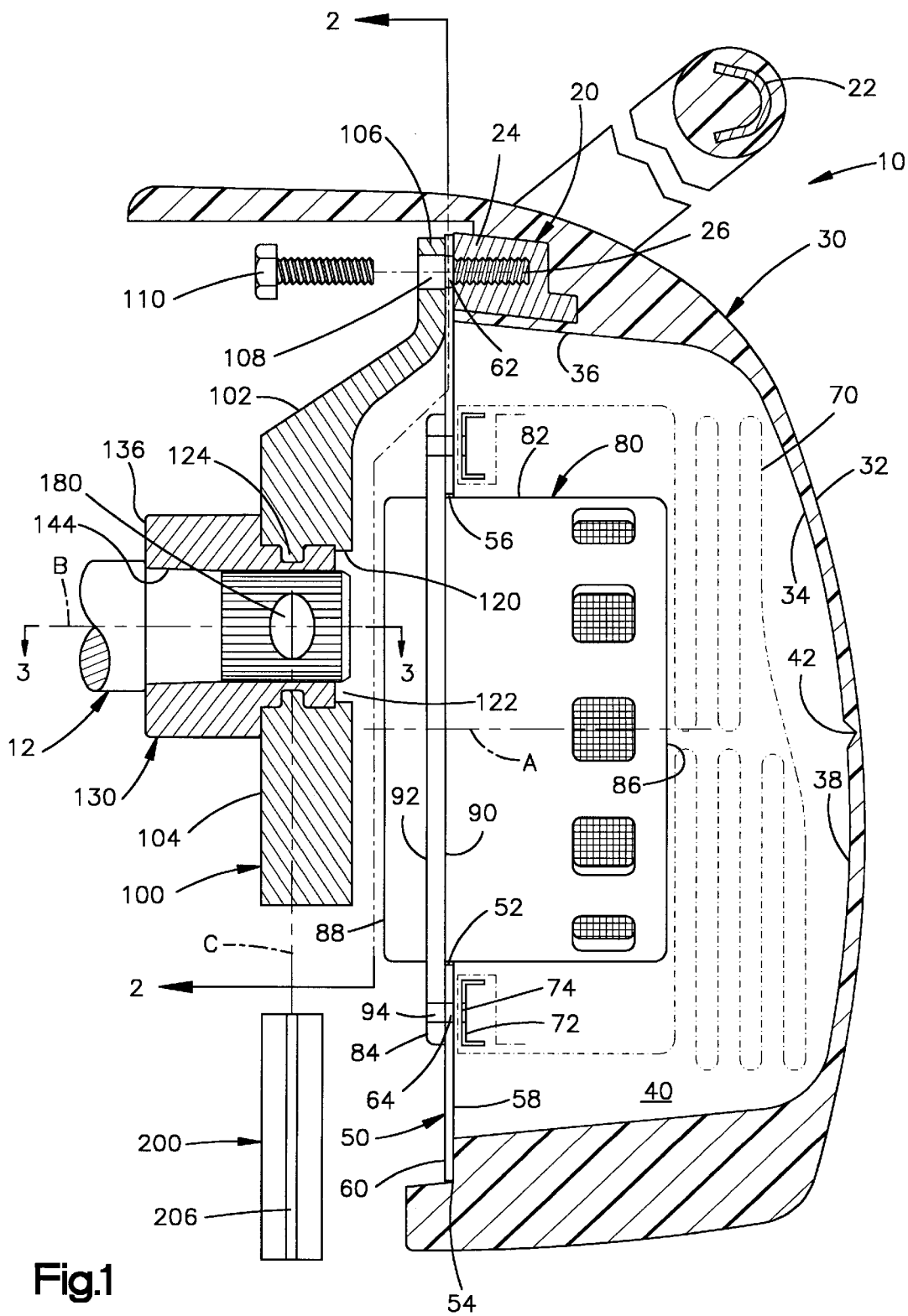
FIG. 1 is a schematic view, partly in section, of a steering wheel assembly and a steering column constructed in accordance with the present invention.

FIG. 1 illustrates a vehicle steering wheel assembly 10 and a vehicle steering column 12 constructed in accordance with the present invention. The steering wheel assembly 10 includes a die cast armature 20 having an outer rim 22 and an inner rim 24 connected by a plurality of radially extending spokes (not shown). The inner rim 24 has three threaded openings 26, one of which is visible in FIG. 1, which are equally spaced about the inner rim.

An integral (or non-removable) cover 30 is molded about the armature 20. In particular, the cover 30 covers the outer rim 22, the inner rim 24 and the spokes. The cover 30 has a continuous outer surface 32 which extends uninterruptedly over a central area of the steering wheel assembly 10. An inner surface 34 of the cover 30 has a side wall portion 36 and an end wall portion 38. The inner surface 34 defines a cavity 40 in the central area of the cover 30. A tear seam 42 extends across the end wall portion 38 of the inner surface 34 of the cover 30. In accordance with the preferred embodiment of the invention, the cover 30 is made of a homogeneous urethane material.

It is contemplated that the cover 30 could alternatively be made of several cover portions rather than the integral cover shown. For example, an alternate cover could include a first cover portion covering the outer rim 22 and spokes and a second cover portion covering the inner rim 24 and the central area of the steering wheel assembly 10.

The steering wheel assembly 10 includes a reaction plate 50. The reaction plate 50 partially encloses the cavity 40 in the cover 30. The reaction plate 50 is a metal ring centered on an axis A. The reaction plate 50 has axially extending inner and outer surfaces 52 and 54, respectively. The inner surface 52 defines a central opening 56 in the reaction plate 50. The reaction plate 50 includes first and second radially extending side surfaces 58 and 60, respectively, which are parallel to one another. A first series of circumferentially spaced apertures 62 in the reaction plate 50 are located adjacent the outer surface 54. The first series of apertures 62 are spaced and located identically to the plurality of threaded openings 26 in the inner rim 24 of the steering wheel armature 20. A second series of circumferentially spaced apertures 64 in the reaction plate 50 are located adjacent the inner surface 52.

The steering wheel assembly 10 includes an inflatable air bag 70 and an actuatable inflator 80 for, when actuated, inflating the air bag. The inflator 80 is circular in cross-section and has a cylindrical outer surface 82. The diameter of the cylindrical outer surface 82 of the inflator 80 is slightly smaller than the diameter of the central opening 56 in the reaction plate 50. A portion of the inflator 80 extends through the central opening 56 in the reaction plate 50 and into the cavity 40 in the cover 30.

The inflator 80 has an annular mounting flange 84 and radially extending first and second end surfaces 86 and 88, respectively. The mounting flange 84 has first and second side surfaces 90 and 92, respectively, which are parallel to the first and second end surfaces 86 and 88, respectively. The first side surface 90 of the mounting flange 84 abuts the second side surface 60 of the reaction plate 50. The mounting flange 84 includes a plurality of openings 94 which are circumferentially spaced so as to align with the second series of apertures 64 in the reaction plate 50.

The air bag 70 is located in the cavity 40 in the cover 30 between the inner surface 34 of the cover and the portion of the inflator 80 extending into the cavity. The air bag 70 includes an annular metal retaining ring 72 sewn into the air bag material for securing the air bag to the reaction plate 50. The retaining ring 72 has a plurality of circumferentially spaced openings 74 which align with the second series of apertures 64 in the reaction plate 50. Fasteners (not shown) extend through the aligned openings 94 in the inflator flange 84, through the apertures 64 in the reaction plate 50, and through the openings 74 in the retaining ring 72 to secure the air bag 70 and the inflator 80 in the steering wheel assembly 10.

Figure 2:
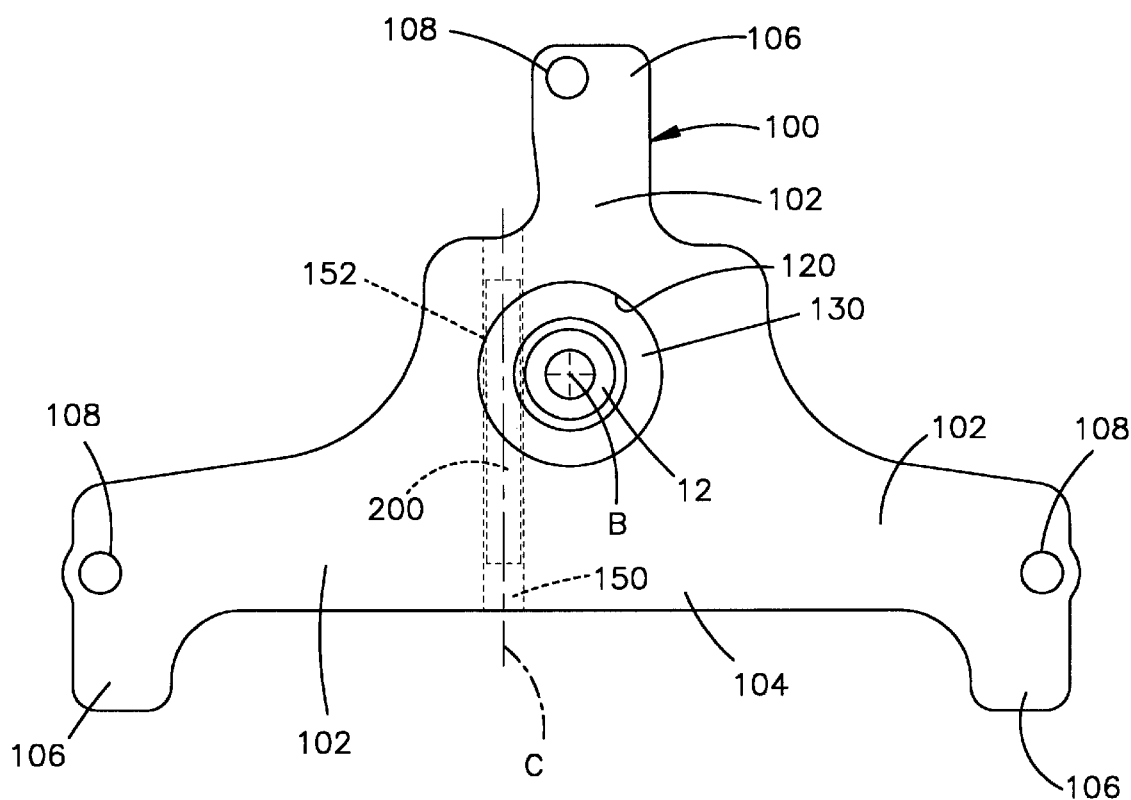
FIG. 2 is a plan view taken along line 2—2 in FIG. 1 and illustrating the parts assembled.

The steering wheel assembly 10 further includes a support plate 100. The support plate 100 is a generally T-shaped part, as is shown in FIG. 2, and is preferably made of cast magnesium. The support plate 100 comprises three leg portions 102 which extend radially and axially from a generally rectangular base portion 104. Each leg portion 102 includes a foot portion 106 located at the terminal end of the leg portion. The foot portions 106 are axially offset from the base portion 104. Each foot portion 106 has an opening 108 which aligns with a respective one of the three threaded openings 26 in the inner rim 24 of the armature 20. Bolts 110 (FIG. 1) extend through the openings 108 in the foot portions 106 of the support plate 100 and into the threaded openings 26 in the armature inner rim 24 to secure the support plate to the steering wheel assembly 10.

The support plate 100 includes an axially ally extending surface 120 which defines a central passage 122 (FIG. 1) through the base portion 104 of the support plate. The passage 122 is centered on an axis B. An annular radially inwardly extending ridge 124 extend from the axially extending surface 120 into the passage 122.

A metal hub 130 is partially located in the passage 122 in the base portion 104 of the support plate 100. The hub 130 is annular and is centered on the axis B. The hub 130 is preferably cast into the support plate 100 and is thus fixed to the support plate. The annular ridge 124 of the support plate 100 extends into the body of the hub 130 to attach the hub non-rotatably to the support plate during casting. Alternatively, it should be understood that the hub 130 could be formed integrally with the support plate 100 as a one-piece cast part.

Figure 3:
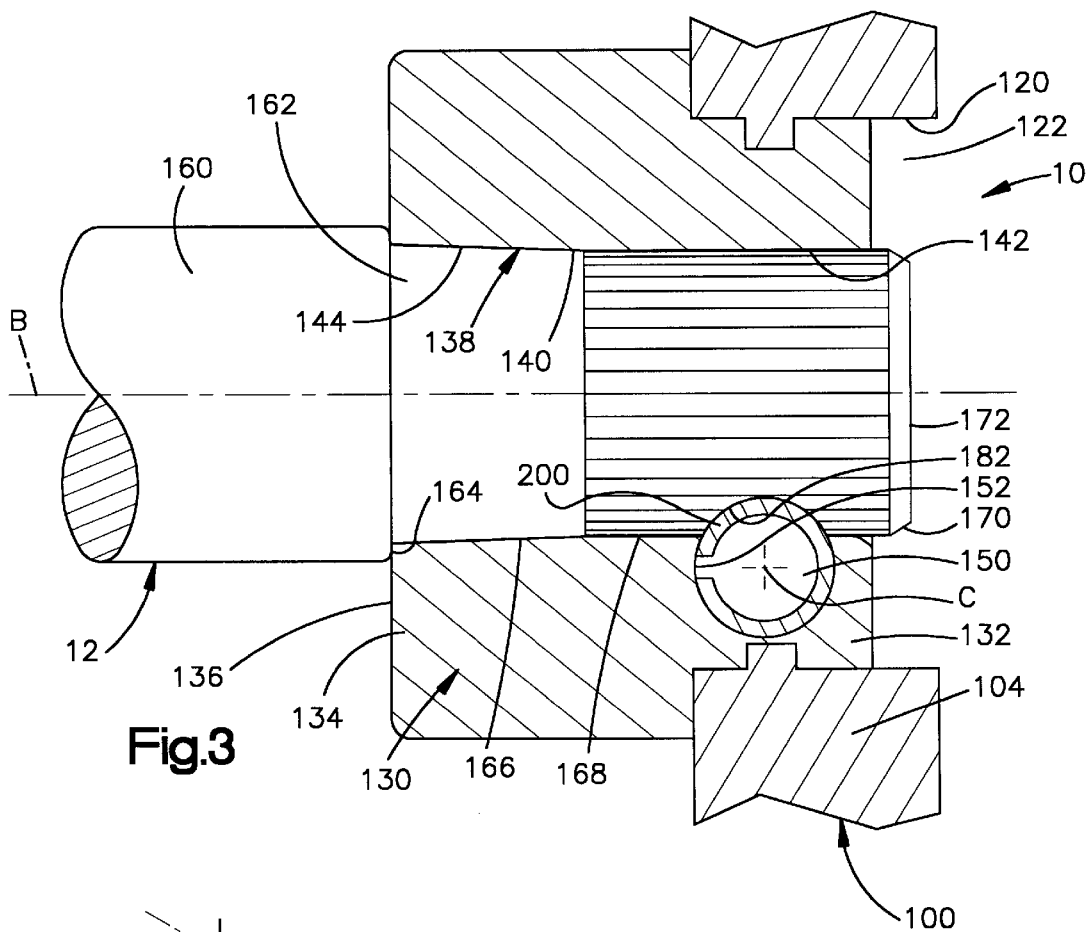
FIG. 3 is a sectional view taken approximately along line 3—3 of FIG. 1.

The hub 130 has first and second end portions 132 and 134, respectively (FIG. 3). The first end portion 132 is disposed within the passage 122 in the support plate 100. The second end portion 134 extends axially beyond the base portion 104 of the support plate 100 and includes a radially extending end surface 136.

An axially extending surface 138 defines a central passage 140 through the hub 130 which extends from the first end portion 132 to the second end portion 134. The passage 140 is centered on the axis B. The surface 138 has a first section 142 adjacent the first end portion 132 of the hub 130 and a second section 144 adjacent the second end portion 134 of the hub. The first section 142 of the surface 138 is splined and the second section 144 of the surface 138 is smooth and tapered.

The base portion 104 of the support plate 100 further includes a transversely extending aperture 150 (FIGS. 2 and 3) defined by a transversely extending surface 152 which extends through the base portion 104 of the support plate and through the hub 130 attached to the support plate. The aperture 150 is centered on an axis C which is offset from the axis B. A portion of the transversely extending aperture 150 intersects the axially extending central passage 140 in the hub 130.

The steering column 12 is a cylindrical shaft member centered on the axis B, which is the axis of rotation for the steering column. As shown in FIG. 3, the steering column 12 includes a main portion 160 and an upper end portion 162. The upper end portion 162 has a radially inwardly extending first surface 164, an axially extending second surface 166, and an axially extending third surface 168. The second surface 166 intersects the first surface 164 and has a tapered contour similar to the tapered second section 144 of the surface 138 in the passage 140 in the hub 130.

The third surface 168 in the upper end portion 162 of the steering column 12 extends between the second surface 166 and a chamfer 170 on a radially extending upper end surface 172 of the steering column. The third surface 168 has splines which mesh with the splined surface in the first section 142 of the surface 138 in the hub 130. An arcuate recess 180 (FIG. 1) is located in the third surface 168 of the upper end portion 162 of the steering column 12. The recess 180 is defined by a surface 182 which has a radius of curvature centered on the axis C. The surface 182 extends transverse to the axis B.

A spring pin (or roll pin) 200 secures the steering wheel assembly 10 against axial movement relative to the steering column 12. The spring pin 200 is a hollow cylindrical member which is preferably made of metal, but could be made of another material, such as a hard plastic. The spring pin 200 is centered on the axis C and includes parallel, cylindrical inner and outer surfaces 202 and 204, respectively (FIG. 4). The diameter of the outer surface 204 of the spring pin 200 is normally slightly larger than the diameter of the transversely extending aperture 150 in the base portion 104 of the support plate 100.

Figure 5:
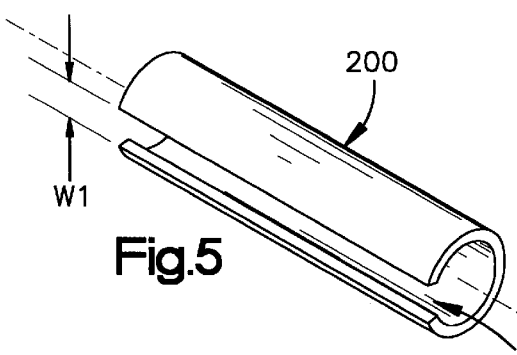

The spring pin 200 further includes an axially extending slot 206 which extends throughout the entire length of the pin. The slot 206 in the spring pin 200 provides the pin with the ability to contract radially and then expand. This feature can be seen in the three conditions for the spring pin 200 shown in FIGS. 4–6. FIG. 5 illustrates the spring pin 200 in a radially expanded normal condition. This is the condition of the spring pin 200 in a free state. In the condition of FIG. 5, the slot 206 in the spring pin 200 has a first circumferential width W1.

Figure 6:
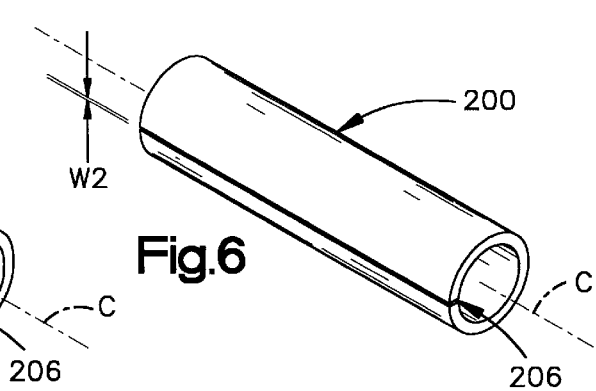

FIG. 6 shows the spring pin 200 in a radially contracted condition. The spring pin 200 is squeezed in order to place it in this condition. In the condition of FIG. 6, the slot 206 in the spring pin 200 has a second circumferential width W2 which is less than the width W1.

FIG. 4 illustrates the spring pin 200 in a condition which is intermediate the expanded condition of FIG. 5 and the contracted position of FIG. 6. This is approximately the condition of the spring pin 200 when the pin has been inserted into the transversely extending aperture 150 in the support plate 100. In the condition of FIG. 4, the slot 206 in the spring pin 200 has a third circumferential width W3 which is less than the width W1 but greater than the width W2.

To attach the steering wheel assembly 100 to the steering column 12, the hub 130 in the support plate 130 of the steering wheel assembly is placed over the steering column such that the upper end portion 162 of the steering column is received in the passage 140 in the hub. The splined section 142 of the surface 138 in the passage 140 meshes with the splined surface 168 of the steering column 12. The steering wheel assembly 10 is oriented so that the recess 180 in the splined surface 168 of the steering column 12 aligns with the transversely extending aperture 150 in the support plate 100 and attached hub 130.

As the steering wheel assembly 10 is pushed onto the wheel column 12, the tapered surfaces 144 and 166 seat against one another and the end surface 136 of the hub 130 comes into contact with the radially extending first surface 164 of the upper end portion 162 of the steering column 12 (FIG. 1). The recess 180 in the steering column 12 and the transversely extending aperture 150 in the support plate 100 now extend co-linearly along the axis C.

The spring pin 200 is radially contracted from its free condition (FIG. 5) to its second condition (FIG. 6). The spring pin 200 is then inserted into the transversely extendingly aperture 150 in the support plate 100. When inside the aperture 150, the pin 200 is released so that it expands radially to its third condition (FIGS. 3 and 4). The outer surface 204 of the spring pin 200 engages the surface 152 defining the aperture 150 and the surface 182 defining the semi-circular recess 180 in the steering column 12. The spring pin 200 exerts a radially outwardly directed biasing force against the surfaces 152 and 182.

Once installed as described above, the engagement of the spring pin 200 and the surfaces 152 and 182 of the aperture 150 and the recess 180, respectively, prevents axial movement of the steering wheel assembly 10 relative to the steering column 12.

To remove the steering wheel assembly 10 from the steering column 12, the spring pin 200 is removed from its position in the aperture 150 in the support plate 100. This is accomplished by forcing a portion of the spring pin 200 out of the aperture 150 and then manually contracting the pin to its second position (FIG. 6) so that it can be completely pulled from the aperture.

From the above description of the invention, those skilled in the art will perceive improvements, changes and modifications. Such improvements, changes and modifications within the skill of the art are intended to be covered by the appended claims.

Having described the invention, I claim:

1. A vehicle steering wheel assembly comprising:

a vehicle steering wheel attached to a vehicle steering column, said steering wheel being rotatable about an axis, said steering wheel including a support plate with an opening centered on said axis, said steering wheel having a hub partially disposed in said opening in said support plate, said hub for non-rotatable attachment to an end of the steering column so that said steering column rotates about said axis upon rotation of said steering wheel, said hub having first surface means for defining a first passage for receiving the end of the steering column and second surface means for defining a second passage extending transverse to said first passage and partially intersecting said first passage; and means for blocking axial movement of said hub relative to the steering column, said means comprising a hollow cylindrical member which is radially contractible for insertion into said second passage and is radially expandable into contact with said second surface means and the steering column, said means for blocking axial movement of said hub being located in said support plate of said steering wheel and being partially disposed in said opening through said support plate.

2. A vehicle steering wheel assembly as defined in claim 1 wherein said steering wheel has a rim portion extending from said support plate, said vehicle steering wheel assembly further comprising an inflatable air bag and an air bag inflator supported by said support plate.

3. A vehicle steering wheel assembly as defined in claim 2 wherein said hollow cylindrical member is located below said air bag and said air bag inflator.

4. A vehicle steering wheel assembly as defined in claim 1 wherein said hollow cylindrical member has a slot which extends axially throughout the entire length of said hollow cylindrical member, said slot having a circumferential width which decreases when said cylindrical member radially contracts and increases when said cylindrical member radially expands.

5. A vehicle steering wheel assembly as defined in claim 4 wherein said slot has a first circumferential width prior to insertion of said hollow cylindrical member into said second passage, a second circumferential width during insertion into said second passage, and a third circumferential width when in said passage and blocking axial movement of said hub relative to the steering column, said third width being of a dimension intermediate said first and second widths.

6. A vehicle steering wheel assembly as defined in claim 1 wherein the steering column has splines and said hub has splines which intermesh with the splines on the steering column to provide said non-rotatable attachment of said hub to said steering column.

7. A vehicle steering wheel assembly as defined in claim 1 wherein the steering column has an arcuate recess extending transverse to said axis, said hollow cylindrical member being radially expandable into said arcuate recess.

* * * * *